United States Patent
Huang et al.

(10) Patent No.: US 11,063,264 B2
(45) Date of Patent: Jul. 13, 2021

(54) POROUS STRUCTURE SI CU COMPOSITE ELECTRODE OF LITHIUM ION BATTERY AND PREPARATION METHOD THEREOF

(71) Applicant: BEIJING UNIVERSITY OF TECHNOLOGY, Beijing (CN)

(72) Inventors: Ting Huang, Beijing (CN); Mengya Cui, Beijing (CN); Rongshi Xiao, Beijing (CN); Wuxiong Yang, Beijing (CN); Qiang Wu, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 140 days.

(21) Appl. No.: 16/428,100

(22) Filed: May 31, 2019

(65) Prior Publication Data
US 2019/0288294 A1 Sep. 19, 2019

Related U.S. Application Data

(63) Continuation of application No. PCT/CN2017/080802, filed on Apr. 17, 2017.

(51) Int. Cl.
*H01M 4/76* (2006.01)
*H01M 4/04* (2006.01)
(Continued)

(52) U.S. Cl.
CPC ........... *H01M 4/762* (2013.01); *H01M 4/043* (2013.01); *H01M 4/049* (2013.01); *H01M 4/134* (2013.01);
(Continued)

(58) Field of Classification Search
None
See application file for complete search history.

(56) References Cited

FOREIGN PATENT DOCUMENTS

| CN | 103270565 | 8/2013 |
| CN | 103999269 | 8/2014 |

OTHER PUBLICATIONS

Xu et al., (Facile fabrication of a nanoporous Si/Cu composite and its application as a high-performance anode in lithium ion battery), School of Chemistry and Chemical Engineering, University of Jinan, China. (Year: 2016).*

(Continued)

*Primary Examiner* — Niki Bakhtiari
(74) *Attorney, Agent, or Firm* — Andrus Intellectual Property Law, LLP

(57) ABSTRACT

The present disclosure discloses a porous structure Si/Cu composite electrode of a lithium ion battery and a preparation method thereof. The composite electrode comprises an active substance, a bulk porous Cu and a current collector, wherein the active substance Si is embedded into the bulk porous Cu, and the bulk porous Cu is in metallurgical bonding with the current collector and plays a dual role of "binder" and "conductive agent", which not only relieves the pulverization and the shedding of the active substance Si particles but also improves electron transmission efficiency; and meanwhile, the porous structure increases the contact area between the active substance Si and electrolyte and increases the reaction efficiency of lithium insertion combination. The method of preparing the composite electrode comprises: with Si, Cu and Al powders as raw materials, preparing a Si—Cu—Al precursor alloy on the Cu current collector by powder metallurgy and diffusion welding technology; and removing Al element in the Si—Cu—Al precursor alloy by using a chemical de-alloying method to obtain a Si/Cu composite electrode with a porous-structure.

5 Claims, 2 Drawing Sheets

(51) Int. Cl.
*H01M 4/134* (2010.01)
*H01M 4/1395* (2010.01)
*H01M 4/36* (2006.01)
*H01M 4/38* (2006.01)
*H01M 4/66* (2006.01)
*H01M 10/0525* (2010.01)

(52) U.S. Cl.
CPC ......... *H01M 4/1395* (2013.01); *H01M 4/362* (2013.01); *H01M 4/386* (2013.01); *H01M 4/661* (2013.01); *H01M 4/667* (2013.01); *H01M 10/0525* (2013.01)

(56) References Cited

OTHER PUBLICATIONS

International Search Report issued in corresponding PCT Application No. PCT/CN2017/080802, dated Dec. 21, 2017.

\* cited by examiner

POROUS STRUCTURE SI CU COMPOSITE ELECTRODE OF LITHIUM ION BATTERY AND PREPARATION METHOD THEREOF

CROSS-REFERENCE TO RELATED PATENT APPLICATIONS

The present application is a continuation of International Application No. PCT/CN2017/080802, filed Apr. 17, 2017, which claims the benefit of priority to Chinese Application No. CN 201710183177.3, filed on Mar. 24, 2017, the content of which is incorporated herein by reference in its entirety.

FIELD OF THE INVENTION

The present disclosure relates to the structure of an anode of a lithium ion battery and a preparation method thereof, and more specially, to a Si/Cu composite electrode with a porous structure and a preparation method thereof, which belongs to the field of advanced manufacturing technology.

BACKGROUND

Lithium Ion Batteries (LIBs) have the advantages of high capacity, no memory effect, fast reversible charge-discharge, a high coulombic efficiency and so on and have been widely used in the fields of mobile phones, notebook computers, electric vehicles and energy storage. At present, the anode material of lithium ion batteries is mainly concentrated on graphite which has been close to the theoretical specific capacity of 372 mAh/g and is difficult to further meet the demands for higher energy/density applications. Among the anode materials of lithium ion batteries, Si has attracted wide attention due to its high lithium intercalation capacity (theoretical specific capacity up to 4200 mAh/g), abundant reserves, and no pollution to the environment.

However, Si has problems such as severe pulverization and shedding and rapid deterioration of electrical conductivity during charge-discharge processes, which become obstacles for using it as anode material. Two phase reactions mainly occur during the charge-discharge process of Si:

(1)

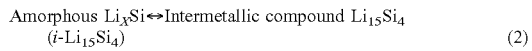
(2)

In the phase reactions, a stress caused by inhomogeneous volumetric expansion of Si (volume change can reach 270%) eventually causes the pulverization of Si and the shedding of Si from a current collector and lose its electrical contact with the current collector, finally resulting in the weakening in the conductivity of the anode structure. Current theoretical research and experimental results demonstrate that the Si electrode performance can be optimized by increasing a graphite conductive coating on Si or reducing a loading density of Si. However, both of these ways will decreases a mass loading capacity of Si and thus limit the increase in total capacity and practical application. At present, the mass loading capacity of the active material Si in the Si electrode with better stability is only 0.1-3.5 mg/cm². For example, Li et al. synthesized a large-size sponge mesoporous Si material by electrochemical etching. The pores inside the material can well accommodate the volume expansion of Si, and the surface of the material is covered by a C layer through a chemical vapor deposition method, and then the anode material is coated on the surface of a current collector by adding a conductive agent and a binder. The loading capacity of the active substance is not high and is about 2 mg/cm², and the coulombic efficiency of the first-time charge-discharge c is 56% and is maintained at 99.4% from the second time, and the areal capacity is only 1.5 mAh/cm² (Li, X., et al., Mesoporous silicon sponge as an anti-pulverization structure for high-performance lithium-ion battery anodes. Nat Commun, 2014. 5: p. 4105.). Yi et al. synthesized a Si—C composite material coated with a graphene layer and coated it on the surface of a current collector. The first coulombic efficiency is 64%, and an average coulombic efficiency form the second cycle is 99.51%, but the loading capacity (3.18 mg/cm²) and areal capacity (3.2 mAh/cm²) of the active substance Si are also not high (Yi, R., et al., Dual conductive network-enabled graphene/Si—C composite anode with high areal capacity for lithium-ion batteries. Nano Energy, 2014. 6: p. 211-218.)

Therefore, how to increase the load capacity of Si and avoid the problem of pulverization and shedding of Si caused by the volumetric expansion of Si under high loading conditions is the key to improve the capacity and performance of the electrode.

SUMMARY OF THE INVENTION

An object of the present disclosure is to provide a Si/Cu composite electrode with a porous structure and is in metallurgical bonding with a current collector and a preparation method thereof. The technical solution of the present disclosure is as follows.

A porous electrode of a lithium ion battery, comprising:
a bulk porous metal having a continuous porous structure;
an active substance embedded into the porous structure of the bulk porous metal; and
a current collector in metallurgical bonding with the bulk porous metal.

In one embodiment, the material of the bulk porous metal is Cu.

In one embodiment, the material of the current collector is Cu.

In one embodiment, the active substance is Si particles.

The present disclosure also provides a lithium ion battery comprising the porous electrode according to any one of the above technical solutions.

The present disclosure also provides a method for preparing a porous electrode, comprising the following steps:
intensively mixing three powders of Si, Cu and Al for compression moulding;
pressing the compression-moulded Si/Cu/Al material and a Cu current collector together and putting them into a vacuum furnace for sintering and diffusion welding to form a Si—Cu—Al precursor alloy and to achieve a metallurgical bonding of the precursor alloy with the current collector; and
removing Al element in the Si—Cu—Al precursor alloy by using a chemical etching method to eventually obtain a porous Si/Cu composite electrode in metallurgical bonding with the current collector.

In one embodiment, the weight percentages of the three powders of Si, Cu and Al are 8-25% Si, 50-72% Cu, and the rest is Al.

In one embodiment, the vacuum sintering and diffusion welding is performed with a temperature of 450-550° C. under a pressure of 0.2-1.0 MPa for 0.5-1.5 hours.

In one embodiment, the etchant used in the chemical etching method is selected from the group consisting of sodium hydroxide, potassium hydroxide, hydrochloric acid, sulfuric acid, nitric acid, phosphoric acid, and hydrofluoric acid.

In one embodiment, the concentration of the etchant used in the chemical etching method is 1-5 mol/L, and the etching time is 4-10 hours.

The advantages of the present disclosure are as follows: 1) the active substance Si is embedded into the block porous Cu that plays a dual role of "binder" and "conductive agent", which not only can relieve the pulverization and the shedding of the active substance Si particles due to volumetric effect but also can improve electron transmission efficiency; and meanwhile, the porous structure increases the contact area between Si and electrolyte and increases the reaction efficiency of lithium insertion combination. Therefore, the composite electrode can obtain an excellent comprehensive performance, i.e., a high capacity and an excellent cycle performance, under a high mass loading of the active substance Si. 2) by combining traditional powder metallurgy, diffusion welding and de-alloying technologies, lithium ion battery anode material-structure-function integrated manufacturing is realized. The manufacturing method is mature and simple.

PREFERRED EMBODIMENTS OF THE PRESENT INVENTION

The present disclosure will be further described below in detail with reference to specific embodiments, but the present disclosure is not limited to the following embodiments.

Herein, the term "porous structure" refers to an electrode structure that is formed by stacking small particles and has a porous-like structure, so as to facilitate the reaction and transfer of substances.

Herein, the term "active substance" refers to a material with lithium intercalation capability.

Herein, the term "binder" refers to a substance that is added for boding with active substances and can be removed or cannot be removed before or during sintering.

Herein, the term "conductive agent" refers to an amount of conductive substance usually added when manufacturing the electrode piece in order to ensure that the electrode has a good charge-discharge performance, it plays a role of collecting micro-current between active substances and collecting micro-current between active substances and the current collector to decrease the contact resistance of the electrode so as to increase movement rate of electrons, and at the same time, can also effectively increase the migration rate of ions in electrode material, thereby increasing charge-discharge efficiency of the electrode.

Here, the term "current collector" refers to a structure or component that collects electric current and its function is mainly to collect and export the electric current generated by the battery active substance.

Here, the term "powder" refers to fine particles composed of dry and dispersed solid particles.

Figure 1:
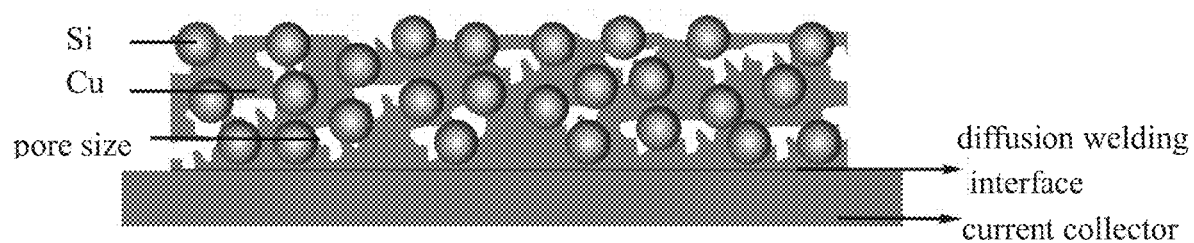
FIG. 1 is a schematic view of a porous structure Si/Cu composite electrode of a lithium ion battery according to the present disclosure.

As shown in FIG. 1, a porous electrode of a lithium ion battery comprising a bulk porous metal having a continuous porous structure; an active substance embedded into the porous structure of the bulk porous metal; and a current collector in metallurgical bonding with the bulk porous metal.

In one embodiment, the material of the bulk porous metal is Cu. In one embodiment, the bulk porous metal has a pore size range of 10 to 20 μm.

In one embodiment, the material of the current collector can be Cu, stainless steel or Ni.

In one embodiment, the active substance is Si particles. In one embodiment, the active substance has a particle size range of 100 nm to 45 μm.

The active substance Si is embedded into the block porous Cu, and the block porous Cu is in metallurgical bonding with the current collector to play a dual role of "binder" and "conductive agent".

For the characteristics of the composite electrode structure, the present disclosure also provides a corresponding manufacturing method comprising the following specific steps.

Step 1: intensively mixing a certain proportion of three powders of Si, Cu and Al for compression moulding.

Step 2: pressing the compression-moulded Si/Cu/Al material and a Cu current collector together and putting them into a vacuum furnace for sintering and diffusion welding to form a Si—Cu—Al precursor alloy and to achieve a metallurgical bonding of the precursor alloy with the current collector.

Step 3: removing Al element in the Si—Cu—Al precursor alloy by using a chemical etching method to eventually obtain a porous Si/Cu composite electrode in metallurgical bonding with the current collector.

In one embodiment, the weight percentages of material for preparing the precursor of the composite electrode are 8-25% Si, 50-72% Cu, and the rest is Al. When the content of Si is too low, the battery capacity is not high. When the content of Si is too high, the content of Cu or Al is necessarily decreased. When the content of Cu is too low, it is difficult to form a continuous porous Cu structure, and the active substance Si is prone to be pulverized and shed during the cycle of the battery. When the content of Al is too low, the porosity is low, and the electrolyte cannot sufficiently come into contact with the active substance Si, which decreases the reaction efficiency of lithium intercalation and lithium deintercalation. When the content of Cu is too high, the loading capacity of the active substance is deceased regardless of whether the content of Si or Al is reduced, which brings an adverse effect, and so is the case when the content of Al is too high.

In one embodiment, the vacuum sintering and diffusion welding is performed with a temperature of 450-550° C. under a pressure of 0.2-1.0 MPa for 0.5-1.5 hours.

In one embodiment, the etchant used in the chemical etching method is selected from the group consisting of sodium hydroxide, potassium hydroxide, hydrochloric acid, sulfuric acid, nitric acid, phosphoric acid, and hydrofluoric acid.

In one embodiment, the concentration of the etchant used in the chemical etching method is 1-5 mol/L, and the etching time is 4-10 hours.

EXAMPLE 1

Raw materials: Si, Cu, Al powders with a weight percentage of Si:Cu:Al=10:72:18, the mesh size of Si powder is −325 mesh, the mesh size of Cu powder is −300 mesh and mesh size of Al powder is −325 mesh.

Etching solution: 3 M HCl solution.

Preparation Process:

Step 1, Compression Moulding

Figure 2:
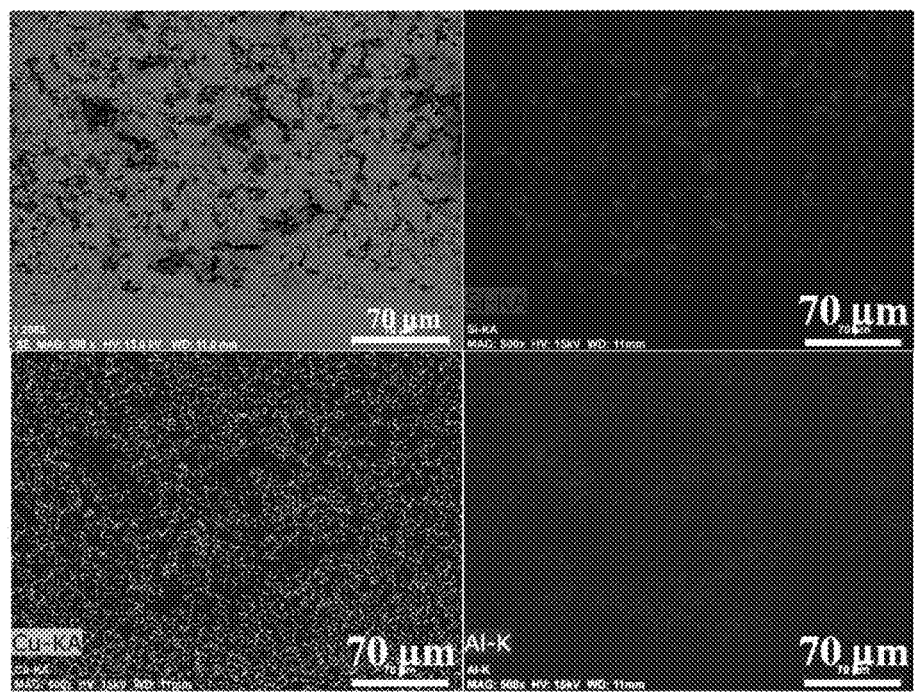
FIG. 2 is a SEM view and an EDS element distribution view of a cross-section of a precursor alloy in the embodiment of FIG. 1.

Using Shanghai Xinnuo SYP-30T type compressing machine to perform compression moulding of the mixed Si/Cu/Al powder with a pressure of 0.4 MPa for 5 minutes to obtain a compression moulded Si/Cu/Al material with a diameter of 8 mm and a thickness of about 200 μm. A SEM view and an EDS element distribution view of a cross-section of a precursor alloy of the material is shown in FIG. 2.

Step 2, Sintering and Diffusion Welding

Figure 3:
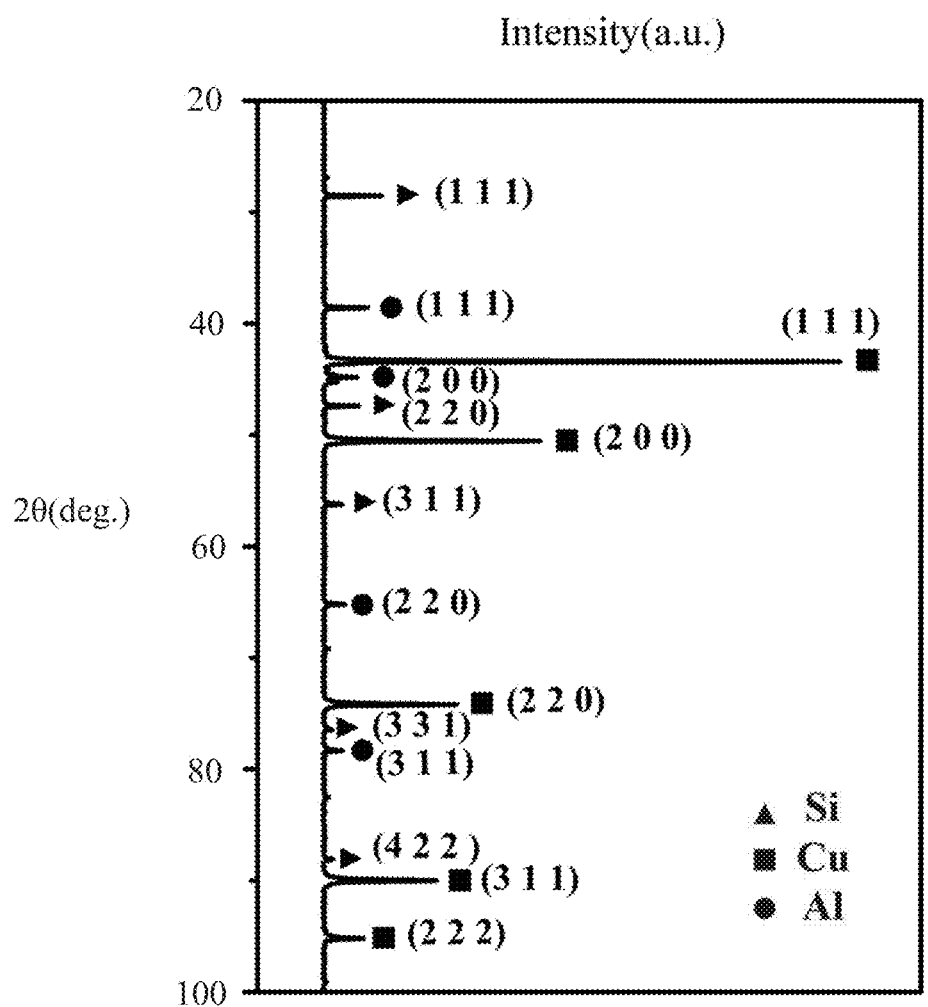
FIG. 3 is an XRD view of the precursor alloy in the embodiment of FIG. 1 after sintering and diffusion welding.

By using the vacuum diffusion welding furnace HT-QA-25 produced by Beijing Hangtian Jinxiang Equipment Co., Ltd., the compression moulded Si/Cu/Al material is closely laminated to a Cu current collector, and then placed in the vacuum furnace and heated to 470° C. with an applied pressure of 0.4 MPa, and the temperature and pressure is maintained for 45 minutes. The atoms diffuse to form a strong metallurgical bonding. An XRD view of the precursor alloy after sintering and diffusion welding is shown in FIG. 3.

Step 3, Chemical De-Alloying Processing

Figure 4:
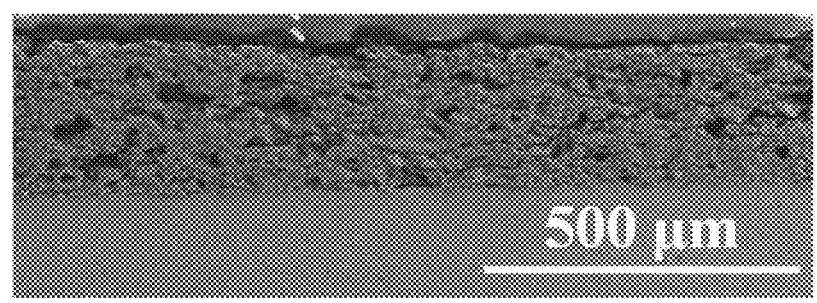
FIG. 4 is a SEM view of a cross-section of the precursor alloy in the embodiment of FIG. 1 after de-alloying.

The sample obtained by sintering and diffusion welding is immersed in HCl solution with a concentration of 3 mol/L for 4-10 hours, then washed with deionized water twice, and then put in HF ethanol solution with a mass percentage of 2% and stirred for 2 hours to dissolve $SiO_2$ possibly presented on the surface of Si, and then washed with deionized water and absolute ethanol respectively for several times to obtain a porous structure Si/Cu composite electrode. A SEM view of a cross-section thereof is shown in FIG. 4.

EXAMPLE 2

Raw materials: Si, Cu, Al powders with a weight percentage of Si:Cu:Al=14:72:14, the mesh size of Si powder is −325 mesh, the mesh size of Cu powder is −300 mesh and mesh size of Al powder is −325 mesh.

Etching solution: 3 M HCl solution.

Preparation Process:

Step 1, Compression Moulding

Using Shanghai Xinnuo SYP-30T type compressing machine to perform compression moulding of the mixed Si/Cu/Al powder with a pressure of 0.4 MPa for 5 minutes to obtain a compression moulded Si/Cu/Al material with a diameter of 8 mm and a thickness of about 200 μm.

Step 2, Sintering and Diffusion Welding

By using the vacuum diffusion welding furnace HT-QA-25 produced by Beijing Hangtian Jinxiang Equipment Co., Ltd., the compression moulded Si/Cu/Al material is closely laminated to a Cu current collector, and then placed in the vacuum furnace and heated to 470° C. with an applied pressure of 0.4 MPa, and the temperature and pressure is maintained for 45 minutes. The atoms diffuse to form a strong metallurgical bonding.

Step 3, Chemical De-Alloying Processing

The sample obtained by sintering and diffusion welding is immersed in HCl solution with a concentration of 3 mol/L for 4-10 hours, then washed with deionized water twice, and then put in HF ethanol solution with a mass percentage of 2% and stirred for 2 hours to dissolve $SiO_2$ possibly presented on the surface of Si, and then washed with deionized water and absolute ethanol respectively for several times to obtain a porous structure Si/Cu composite electrode.

EXAMPLE 3

Raw materials: Si, Cu, Al powders with a weight percentage of Si:Cu:Al=25:50:25, the mesh size of Si powder is −325 mesh, the mesh size of Cu powder is −300 mesh and mesh size of Al powder is −325 mesh.

Etching solution: 3M HCl solution.

Preparation Process:

Step 1, Compression Moulding

Using Shanghai Xinnuo SYP-30T type compressing machine to perform compression moulding of the mixed Si/Cu/Al powder with a pressure of 0.4 MPa for 5 minutes to obtain a compression moulded Si/Cu/Al material with a diameter of 8 mm and a thickness of about 200 μm.

Step 2, Sintering and Diffusion Welding

By using the vacuum diffusion welding furnace HT-QA-25 produced by Beijing Hangtian Jinxiang Equipment Co., Ltd., the compression moulded Si/Cu/Al material is closely laminated to the Cu current collector, and then placed in the vacuum furnace and heated to 470° C. with an applied pressure of 0.4 MPa, and the temperature and pressure is maintained for 45 minutes. The atoms diffuse to form a strong metallurgical bonding.

Step 3, Chemical De-Alloying Processing

The sample obtained by sintering and diffusion welding is immersed in HCl solution with a concentration of 3 mol/L for 4-10 hours, then washed with deionized water twice, and then put in HF ethanol solution with a mass percentage of 2% and stirred for 2 hours to dissolve $SiO_2$ possibly presented on the surface of Si, and then washed with deionized water and absolute ethanol respectively for several times to obtain a porous structure Si/Cu composite electrode.

Electrochemical Performance Test

The performance of the porous structure Si/Cu composite electrode prepared in Example 1 is tested. The Wuhan LAND CT2001D test system is used during the test. The current density is taken as 100 mA/g, and the test result shows an areal capacity up to 9.6 mAh/cm2, the coulombic efficiency of the first discharge is 76% and the coulombic efficiency is maintained above 93% from the second charge-discharge. It can be seen that the composite electrode of the present disclosure has a good overall performance.

The above-mentioned embodiments merely represent several embodiments of the present disclosure, and the description thereof is more specific and detailed, but it should not be understood as limiting the scope of the present disclosure. It should be noted that, for those skilled in the art, several variations and improvements may be made without departing from the concept of the present disclosure, and these are all within the protection scope of the present disclosure.

The invention claimed is:

1. A method for preparing a porous electrode, comprising:
   mixing powders of Si, Cu and Al to form a Si/Cu/Al material;
   performing a compression-moulding step on the Si/Cu/Al material;
   performing a sintering and diffusion welding step by pressing the compression-moulded Si/Cu/Al material and a Cu current collector together and putting the compression-moulded Si/Cu/Al material and the Cu current collector into a vacuum furnace to form a Si—Cu—Al precursor alloy and to achieve a metallurgical bonding of the Si—Cu—Al precursor alloy with the Cu current collector; and removing Al element in the Si—Cu—Al precursor alloy by using a chemical etching method to obtain a porous Si/Cu composite electrode in metallurgical bonding with the Cu current collector.

2. The method of claim 1, wherein the weight percentages of the powders of Si, Cu and Al are 8-25% Si, 50-72% Cu, and the rest is Al.

3. The method of claim 1, wherein the sintering and diffusion welding step is performed with a temperature of 450-550° C. under a pressure of 0.2-1.0 MPa for 0.5-1.5 hours.

4. The method of claim 1, wherein an etchant used in the chemical etching method is selected from the group consisting of sodium hydroxide, potassium hydroxide, hydrochloric acid, sulfuric acid, nitric acid, phosphoric acid, and hydrofluoric acid.

5. The method of claim 4, wherein the concentration of the etchant used in the chemical etching method is 1-5 mol/L, and the etching time is 4-10 hours.

* * * * *